United States Patent
Yamauchi et al.

(10) Patent No.: US 11,192,051 B2
(45) Date of Patent: Dec. 7, 2021

(54) ELEMENT ASSEMBLY AND FILTER (71) Applicant: Koganei Corporation, Koganei (JP)

(72) Inventors: Takeshi Yamauchi, Koganei (JP); Hiraku Sakai, Koganei (JP)

(73) Assignee: Koganei Corporation, Tokyo (JP)

( * ) Notice: Subject to any disclaimer, the term of this patent is extended or adjusted under 35 U.S.C. 154(b) by 1031 days.

(21) Appl. No.: 15/561,097

(22) PCT Filed: Aug. 26, 2015

(86) PCT No.: PCT/JP2015/074095
§ 371 (c)(1),
(2) Date: Sep. 25, 2017

(87) PCT Pub. No.: WO2016/151882
PCT Pub. Date: Sep. 29, 2016

(65) Prior Publication Data
US 2018/0117511 A1 May 3, 2018

(30) Foreign Application Priority Data
Mar. 26, 2015 (JP) .............. JP2015-063533

(51) Int. Cl.
*B01D 45/16* (2006.01)
*F04B 39/16* (2006.01)
(Continued)

(52) U.S. Cl.
CPC ............. *B01D 45/16* (2013.01); *B01D 45/12* (2013.01); *B01D 46/0031* (2013.01);
(Continued)

(58) Field of Classification Search
None
See application file for complete search history.

(56) References Cited

U.S. PATENT DOCUMENTS 3,386,230 A * 6/1968 Riesberg .................. B04C 1/00
55/337
4,162,148 A * 7/1979 Furstenberg ....... B01D 46/0065
96/425
(Continued)

FOREIGN PATENT DOCUMENTS

DE 2219846 A1 10/1973
DE 698 33 383 T2 10/2006
(Continued)

OTHER PUBLICATIONS

Espacenet Translation of WO 2015/160029 (Year: 2015).*
International Search Report for PCT Serial No. PCT/JP2015/074095 dated Nov. 16, 2015.

*Primary Examiner* — Bobby Ramdhanie
*Assistant Examiner* — Brit E. Anbacht
(74) *Attorney, Agent, or Firm* — McCormick, Paulding & Huber PLLC (57) ABSTRACT

A filter has a port block provided with: an inflow port to which compressed air is supplied, and an outflow port from which purified compressed air flows out. A filter container accommodating an element assembly is attached to the port block. The element assembly has a filter element provided between an upper holder and a lower holder, and a blade cylinder provided inside the filter element. Compressed air supplied from the inflow port and filtered through the filter element is swirled by the blade cylinder.

7 Claims, 7 Drawing Sheets (51) Int. Cl.
    *B01D 45/12* (2006.01)
    *B01D 46/00* (2006.01)
    *B01D 46/24* (2006.01)
(52) U.S. Cl.
    CPC ..... *B01D 46/0049* (2013.01); *B01D 46/2403* (2013.01); *F04B 39/16* (2013.01)

(56) References Cited

U.S. PATENT DOCUMENTS

| | | | | |
|---|---|---|---|---|
| 4,516,994 | A * | 5/1985 | Kocher | B01D 45/12 210/304 |
| 5,271,245 | A * | 12/1993 | Westermeyer | B01D 50/002 62/470 |
| 5,395,410 | A * | 3/1995 | Jang | B01D 45/14 126/299 D |
| 6,004,365 | A * | 12/1999 | Fiacco | B01D 45/14 55/400 |
| 6,251,168 | B1 * | 6/2001 | Birmingham | B01D 45/08 55/330 |
| 6,372,005 | B1 * | 4/2002 | Fiacco | B01D 45/14 55/400 |
| 6,514,304 | B2 * | 2/2003 | Fiacco | B01D 45/14 55/400 |
| 8,147,575 | B2 * | 4/2012 | Lucas | B01D 45/12 55/337 |
| 2002/0069626 | A1 * | 6/2002 | Fiacco | F04D 29/703 55/400 |
| 2009/0133370 | A1 * | 5/2009 | Yoo | A47L 9/1683 55/429 |
| 2009/0229071 | A1 * | 9/2009 | Fester | B01D 45/12 15/347 |
| 2009/0300871 | A1 * | 12/2009 | Seo | A47L 5/28 15/347 |
| 2011/0056379 | A1 * | 3/2011 | Lucas | B01D 45/12 96/216 |
| 2014/0059800 | A1 * | 3/2014 | Bassett | A47L 9/106 15/353 |
| 2014/0083064 | A1 * | 3/2014 | Sakai | F04B 39/16 55/449 |
| 2014/0096683 | A1 * | 4/2014 | Azwell | B01D 46/0049 95/268 |
| 2014/0124054 | A1 | 5/2014 | Yamase et al. | |
| 2015/0260134 | A1 * | 9/2015 | Lay | B01D 46/2403 55/385.3 |
| 2015/0369182 | A1 * | 12/2015 | Steinman | F02M 37/54 55/309 |
| 2018/0117511 | A1 * | 5/2018 | Yamauchi | B01D 45/16 |
| 2018/0126312 | A1 * | 5/2018 | Yamauchi | B01D 46/0049 |
| 2018/0256770 | A1 * | 9/2018 | Jang | A61L 9/18 |
| 2020/0338489 | A1 * | 10/2020 | Lepold | B01D 46/0064 |

FOREIGN PATENT DOCUMENTS

| | | | | |
|---|---|---|---|---|
| DE | 11 2011 105 229 B4 | 1/2018 | | |
| EP | 1 155 724 A1 | 11/2001 | | |
| JP | H07-204440 A | 8/1995 | | |
| JP | 2012-020242 A | 2/2012 | | |
| JP | 2012-239987 A | 12/2012 | | |
| JP | 2013-000659 A | 1/2013 | | |
| WO | WO-2012157515 A1 * | 11/2012 | ............ | B04C 5/103 |
| WO | WO-2015160029 A1 * | 6/2015 | ......... | B01D 46/0049 |

* cited by examiner

FIG. 8 ically-cut portion of the element assembly, as seen from the bottom

ELEMENT ASSEMBLY AND FILTER

CROSS-REFERENCE TO RELATED APPLICATIONS

This application is a National Stage application of International Patent Application No. PCT/JP2015/074095, filed on Aug. 26, 2015, which claims priority to Japanese Patent Application No. 2015-063533, filed on Mar. 26, 2015, each of which is hereby incorporated by reference in its entirety.

TECHNICAL FIELD

The present invention relates to an element assembly and a filter utilized for removing foreign matters, such as liquid and dust, contained in compressed air to be supplied to a pneumatic device.

BACKGROUND ART

Compressed air is supplied from a pneumatic source to a pneumatic device, such as a pneumatic cylinder, through a pneumatic line, such as piping or a hose. The pneumatic source and the pneumatic device are connected to each other through the pneumatic line, thereby forming a pneumatic circuit. Compressed air to be supplied from the pneumatic source to the pneumatic device is regarded as "air-to-be-treated", and the pneumatic circuit is provided with a filter for removing foreign matters, such as liquid, oil, and dust, contained in the air-to-be-treated.

According to a filter described in Japanese Patent Application Laid-Open Publication No. 2012-239987, air-to-be-treated is supplied to the filter through an inflow port and is swirled. A centrifugal force acting on liquid, oil, and other foreign matters contained in the air-to-be-treated differs in strength from a centrifugal force acting on the air-to-be-treated, and thus, foreign matters are removed by using this difference between the centrifugal forces. A blade cylinder portion having a plurality of blades arranged into a cylindrical form is incorporated in a filter container to swirl the air-to-be-treated. In this manner, when the centrifugal force is applied to the air-to-be treated, liquid, oil, and other foreign matters can be removed from the air-to-be-treated by using the difference between the centrifugal forces.

SUMMARY OF THE INVENTION

By providing a conical portion on a lower side of the blade cylinder portion, and by using the difference in centrifugal forces, efficiency of removing liquid, oil, and other foreign matters can be maintained. This is because the conical portion tapered toward its lower portion prevents the speed of swirling air generated in the blade cylinder portion from slowing down when moved toward the lower portion of the blade cylinder portion. However, foreign matters may be mixed with the compressed air swirling and flowing from a bottom portion of the conical portion toward an outflow port.

An object of the present invention is to provide a filter that removes liquid, oil, and other foreign matters with high efficiency.

According to one aspect of the present invention, there is provided a filter for removing foreign matters contained in compressed air to purify the compressed air, the filter comprising: a port block provided with: an inflow port to which compressed air is supplied; and an outflow port from which purified compressed air flows out; a filter container attached to the port block, the filter container and the port block collectively forming a housing chamber; and an element assembly disposed inside the housing chamber, wherein the element assembly includes: an upper holder having a discharge pipe; a lower holder; and a filter element provided between the upper holder and the lower holder, wherein a blade cylinder is provided inside the filter element, the blade cylinder having a plurality of blades that extend in a vertical direction of the blade cylinder, are tilted in a circumferential direction of the blade cylinder, and are arranged in a cylindrical form.

According to another aspect of the present invention, there is provided an element assembly utilized in a filter that removes foreign matters contained in compressed air to purify the compressed air, the element assembly comprising: an upper holder; a lower holder; a filter element provided between the upper holder and the lower holder; and a blade cylinder having a plurality of blades that extend in a vertical direction of the blade cylinder, are tilted in a circumferential direction, and are arranged in a cylindrical form, the blade cylinder being disposed inside the filter element.

The blade cylinder having blades is provided inside the filter element. Compressed air is supplied from the inflow port, is filtered through the filter element, and is swirled by the blades. Hence, a swirl flow of compressed air is generated in an inner space of the blade cylinder. Liquid and oil contained in the air-to-be-treated collide and agglomerate as they are filtered through the filter element, thereby growing into droplets of certain sizes that flow into the inner space of the blade cylinder. Since the droplets adhere to inner surfaces of the blades by the swirl flow of compressed air, the droplets agglomerate without being scattered, and drop by their own weight. This process improves the efficiency of removing foreign matters.

DETAILED DESCRIPTION OF PREFERRED EMBODIMENTS

Hereinafter, embodiments of the present invention will be described in detail with reference to the drawings. In the drawings, components that are the same as each other are denoted by the same reference numerals.

Figure 1:
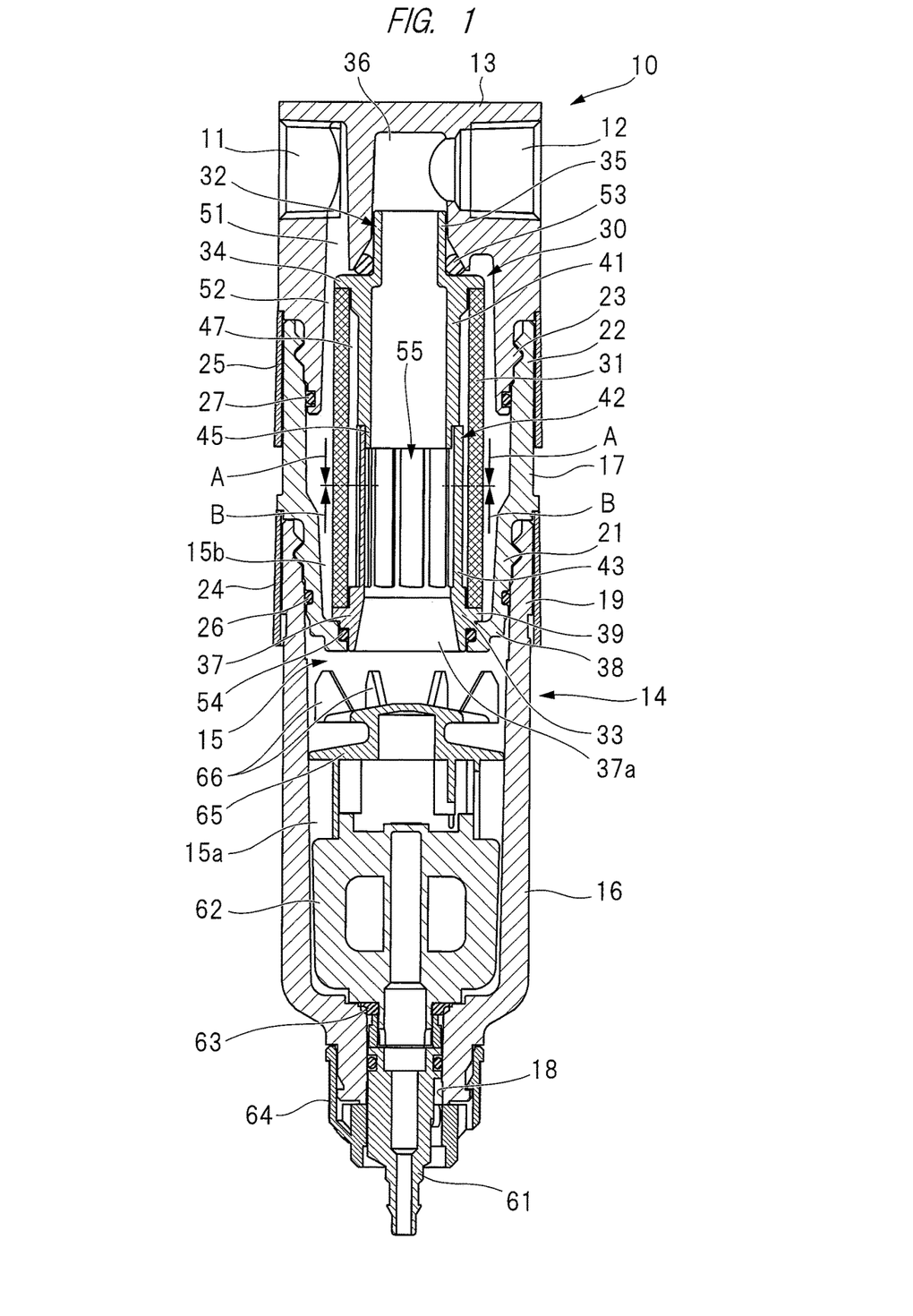
FIG. 1 is a longitudinal cross-sectional view showing a filter according to an embodiment of the present invention.

A filter 10 shown in FIG. 1 has a port block 13 provided with an inflow port 11 and an outflow port 12. The inflow port 11 is connected to an air guide member, such as piping or a hose, and air-to-be-treated is supplied to the filter 10 through the air guide member. The outflow port 12 is connected to an air guide member, such as piping or a hose, and purified compressed air flows out through the outflow port 12.

The filter 10 has a filter container 14 detachably attached to a lower end portion of the port block 13. The filter 10 is used with the port block 13 located on an upper side of the filter 10, and with the filter container 14 located on a lower side of the filter 10. The port block 13 of the filter 10 is mounted to a wall surface (not shown), or the like, by an attachment (not shown). A vertical direction of each of the components described in this specification is based on the position of the filter 10 when in use.

The filter container 14 is provided with a housing chamber 15. The filter container 14 shown in FIG. 1 has a first container 16 and a second container 17. The first container 16 has a lower end portion provided with a liquid discharge hole 18, and an upper end portion provided with a female screw portion 19. The second container 17 has a lower end portion provided with a male screw portion 21 that is screwed to the female screw portion 19. The second container 17 further has an upper end portion provided with a female screw portion 22, and the port block 13 is provided with a male screw portion 23 that is screwed to the female screw portion 22. Therefore, rotating the first container 16 relative to the second container 17 allows the first container 16 to be attached to or detached from the second container 17. Rotating the second container 17 relative to the port block 13 allows the filter container 14 to be attached to or detached from the port block 13. However, as another type of the filter container 14, the first container 16 and the second container 17 may be integral with each other.

An annular lock member 24 is attached to an outside of the upper end portion of the first container 16 and is movable in the vertical direction. Engaging the lock member 24 with the second container 17 prevents the first container 16 from rotating relative to the second container 17. Similarly, an annular lock member 25 is attached to an outside of the upper end portion of the second container 17 and is movable in the vertical direction. Engaging the lock member 25 with the port block 13 prevents the second container 17 from rotating relative to the port block 13. A seal member 26 seals a gap between the first container 16 and the second container 17, and a seal member 27 seals a gap between the second container 17 and the port block 13.

The housing chamber 15 is partitioned into a storage chamber 15a inside the first container 16 and a filter chamber 15b inside the second container 17. An element assembly 30 is disposed inside the filter chamber 15b. The element assembly 30 includes a cylindrical filter element 31 having filtering and agglomerating functions, an upper holder 32 fixed to an upper end portion of the filter element 31, and a lower holder 33 fixed to a lower end portion of the filter element 31. In other words, the filter element 31 is provided between the upper holder 32 and the lower holder 33.

The upper holder 32 has a flange portion 34, and an upper end surface of the filter element 31 abuts on the flange portion 34. A discharge pipe 35 is provided on the flange portion 34 and projects upward. A communication hole 36 is formed on the port block 13, and the discharge pipe 35 is fitted in the communication hole 36 to be attached to the port block 13. The discharge pipe 35 and the outflow port 12 communicate with each other through the communication hole 36. The lower holder 33 has an annular portion 37, and is attached to an annular supporting portion 38 provided on the second container 17. The annular portion 37 is provided with a discharge hole 37a that communicates with the storage chamber 15a. The discharge hole 37a is formed by a tapered surface with its inner diameter increasing toward a lower end portion of the annular portion 37. A flange portion 39 is provided on the annular portion 37 and projects radially outward from the annular portion 37. A lower end surface of the filter element 31 abuts on the flange portion 39.

Figure 2:
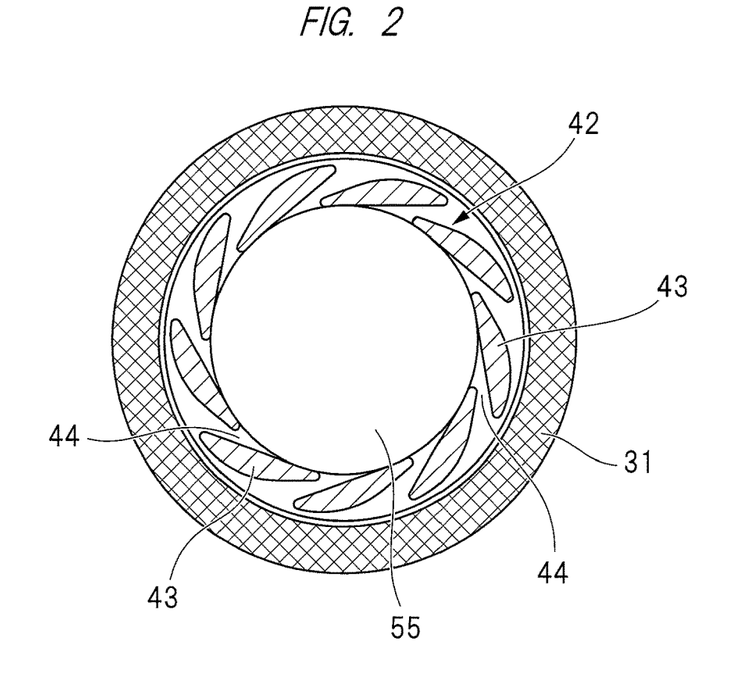
FIG. 2 is a cross-sectional view of the filter taken along line A-A of FIG. 1.
Figure 3:
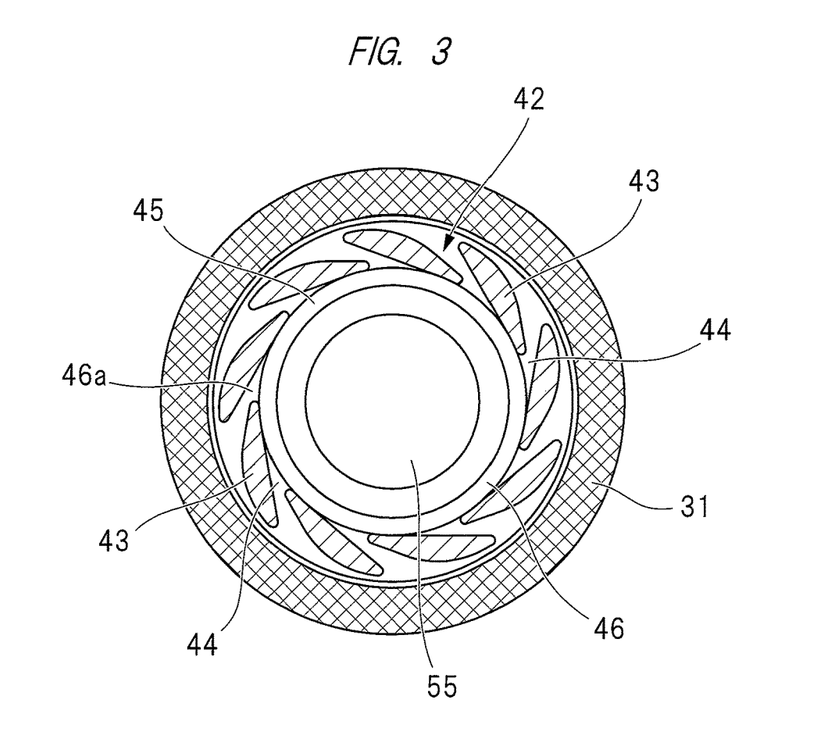
FIG. 3 is a cross-sectional view of the filter taken along line B-B of FIG. 1.

A cylindrical air guide pipe 41 is provided on an inner surface of the flange portion 34 and projects downward. An outer diameter of the air guide pipe 41 is smaller than an inner diameter of the filter element 31. Thus, the air guide pipe 41 is provided inside the filter element 31 and extends in an axial direction of the filter element 31. A length of the air guide pipe 41 in the axial direction is shorter than a length of the filter element 31 in the axial direction, and the air guide pipe 41 is integrally provided on the upper holder 32. A blade cylinder 42 is integrally provided on the lower holder 33. The element assembly 30, therefore, includes the blade cylinder 42. As shown in FIGS. 2 and 3, the blade cylinder 42 has a plurality of blades 43 extending in the vertical direction and tilted in a circumferential direction of the blade cylinder 42. A slit 44 is formed between each pair of blades 43 adjacent to each other in the circumferential direction of the blade cylinder 42. Each blade 43 partially overlaps another blade 43 adjacent in the circumferential direction of the blade cylinder 42, with the slit 44 therebetween. Therefore, the compressed air supplied from outside of the blade cylinder 42 is given a component of velocity in the circumferential direction as it passes through the slits 44, and is not flowed directly to an inside of the blade cylinder 42 in a radially inward direction. Thus, a flow of the compressed air supplied from outside of the blade cylinder 42 through the slits 44 to reach the inside of the blade cylinder 42 is changed to a swirl flow.

Figure 5:
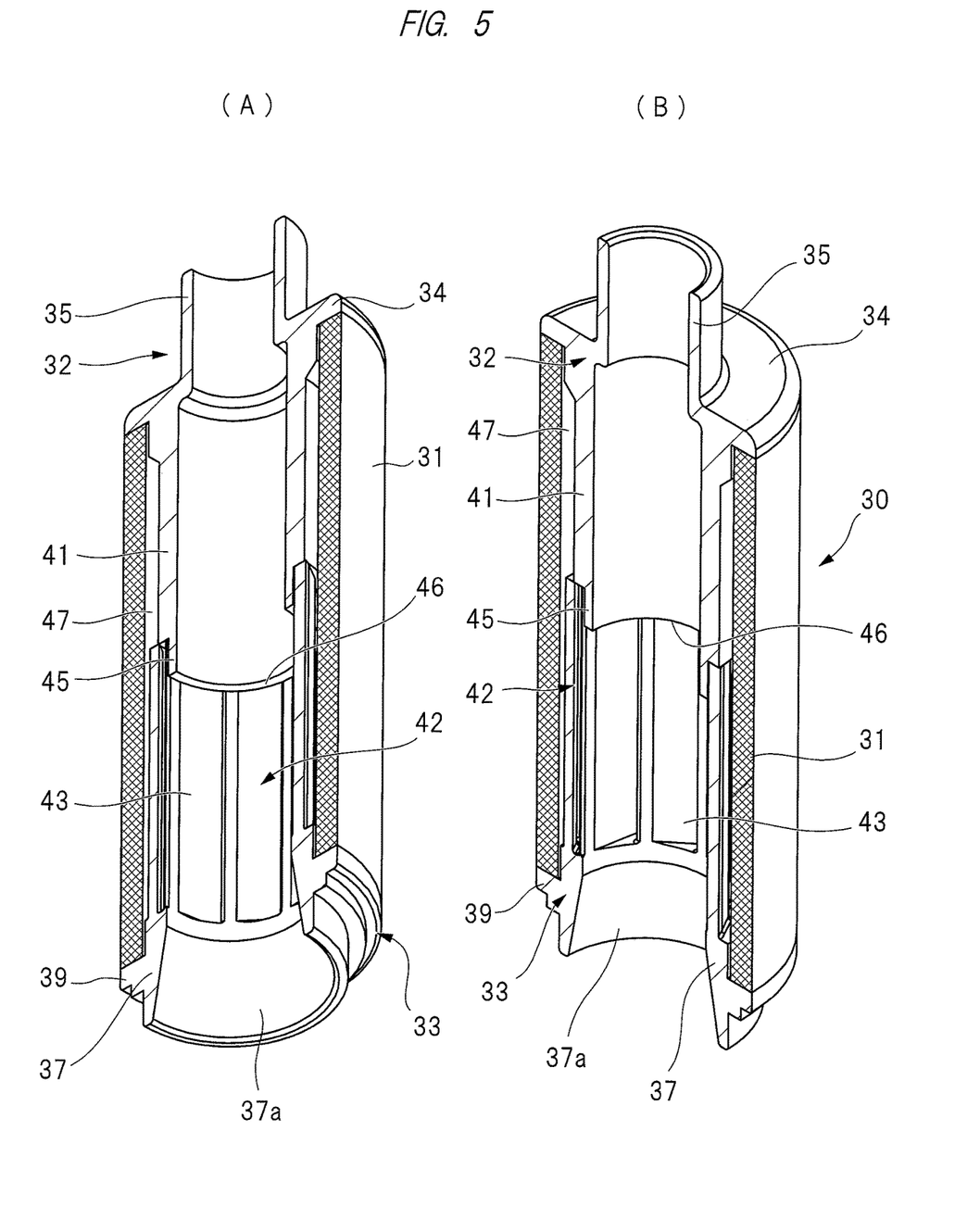
FIG. 5(A) is a perspective view showing a longitudinally-cut portion of the element assembly, as seen from the bottom side thereof.
FIG. 5(B) is a perspective view showing the longitudinally-cut portion of the element assembly of FIG. 5(A), as seen from the top side thereof.

Upper end portions of the blades 43 are fitted to an outside of a fitting portion 45 provided on a lower end portion of the air guide pipe 41. As shown in FIGS. 3 and 5, the fitting portion 45 has an annular stepped portion 46 overhanging from its end surface, more radially inward relative to inner surfaces of the blades 43. In other words, an inner diameter of the air guide pipe 41 is smaller than an inner diameter of the blades 43 defined by tangent lines along inner portions of the blades 43. This difference between the two inner diameters defines the annular stepped portion 46. Each of the air guide pipe 41 and the blade 43 is about half in length compared to the filter element 31. The air guide pipe 41 faces an inner side of an upper portion of the filter element 31, and the blades 43 face an inner side of a lower portion of the filter element 31. An air passage space 47 is formed between the filter element 31 and the air guide pipe 41 along with the blades 43.

The blade cylinder 42 shown in FIG. 1 has a structure in which the blades 43 and the annular portion 37 of the lower holder 33 are integral with each other. The blade cylinder 42, however, may be of a structure that includes the blades 43 and an annular member integrated with lower end portions of the blades 43. In this case, the blade cylinder 42 is an element separate from the lower holder 33. The blade cylinder 42 may be of a structure that includes the blades 43 and an annular member integrated with upper end portions of the blades 43. As shown in FIG. 1, the structure in which the blades 43 and the lower holder 33 are integral with each other requires fewer components than the structure in which the blade cylinder and the lower holder 33 are separate elements. Additionally, the blade cylinder 42 may be of a structure in which the blades 43 are integrally formed on the air guide pipe 41.

Figure 4:
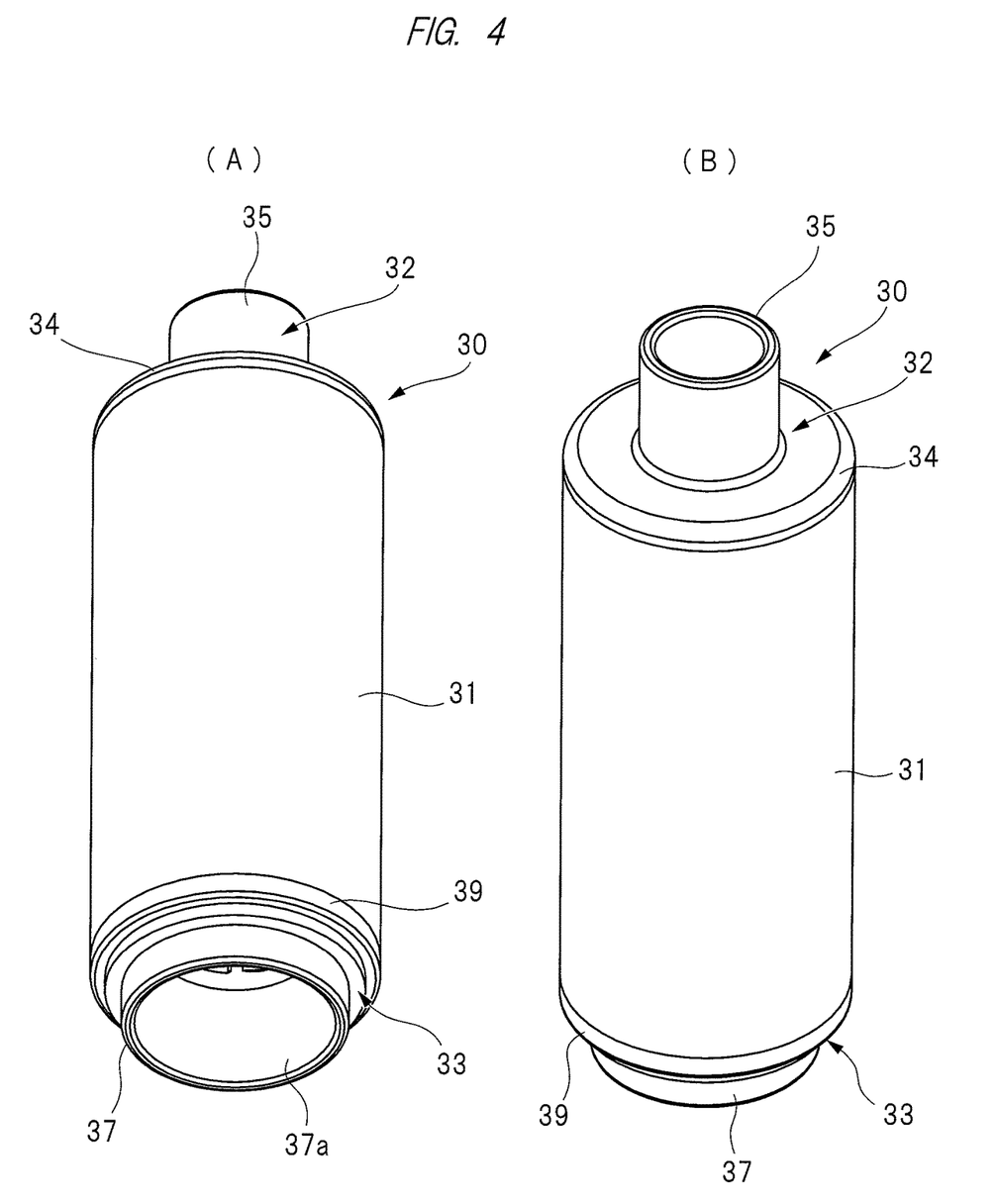
FIG. 4(A) is an external perspective view of an element assembly, as seen from a bottom side thereof.
FIG. 4(B) is an external perspective view of the element assembly, as seen from a top side thereof.
Figure 6:
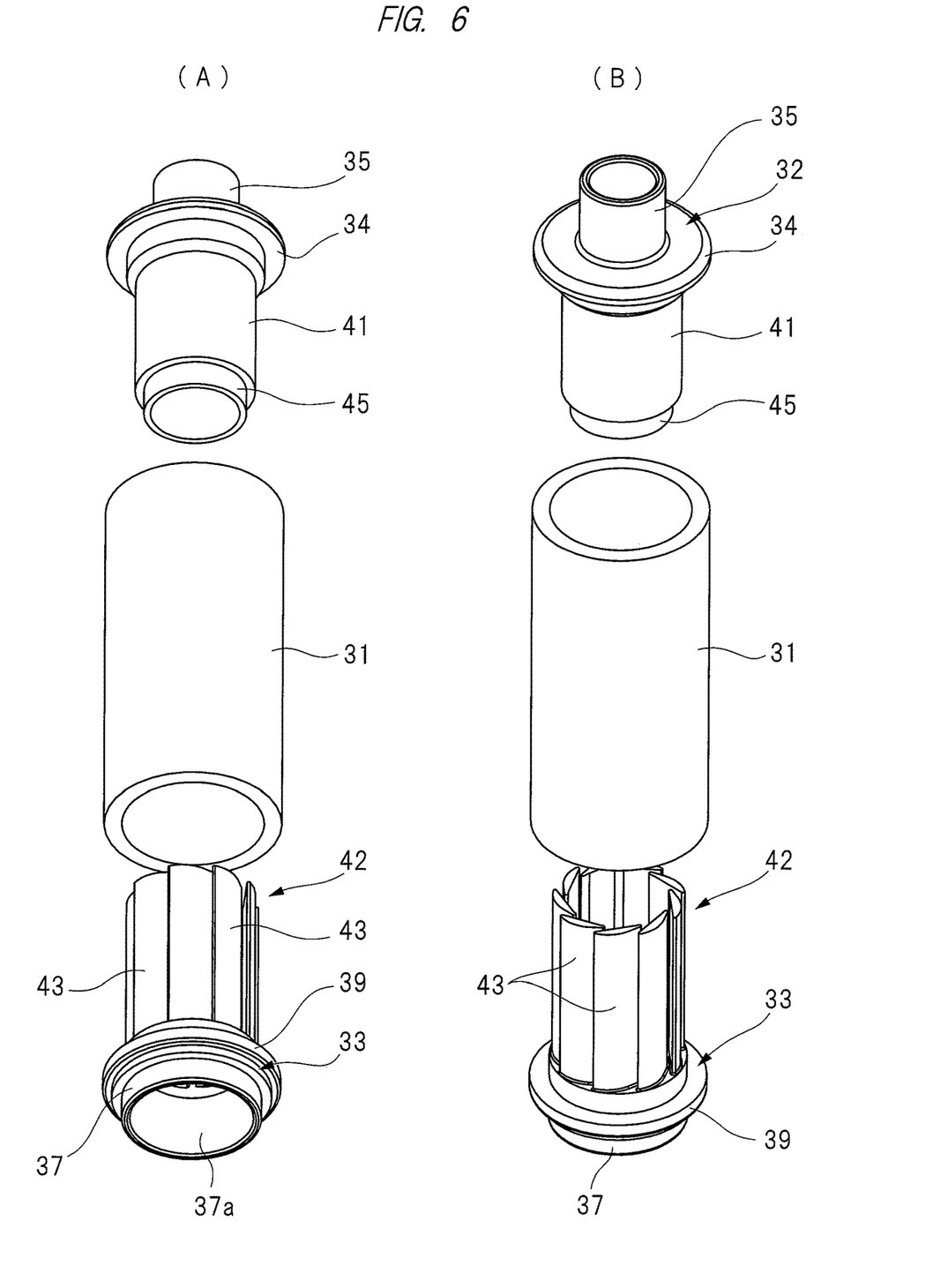
FIG. 6(A) is an exploded perspective view of the element assembly, as seen from the bottom side thereof.
FIG. 6(B) is an exploded perspective view of the element assembly of FIG. 6(A), as seen from the top side thereof.

As described above, the element assembly 30 includes: the upper holder 32, the lower holder 33, the filter element 31 provided between the upper holder 32 and the lower holder 33, the blade cylinder 42 provided inside the filter element 31, and the air guide pipe 41. The upper holder 32 integral with the air guide pipe 41, the lower holder 33 integral with the blade cylinder 42, and the filter element 31 are assembled together to form the element assembly 30. An external view of the element assembly 30 is shown in FIG. 4, and an exploded view of the element assembly 30 is shown in FIG. 6.

As shown in FIG. 1, the port block 13 and the second container 17 collectively form the filter chamber 15b, and the element assembly 30 is disposed inside the filter chamber 15b. A communication passage 51 is formed in the port block 13 and communicates with the inflow port 11. The communication passage 51 communicates with an inflow space 52 outside the element assembly 30. A seal member 53 seals a gap between the upper holder 32 and the port block 13. A seal member 54 seals a gap between the lower holder 33 and the second container 17.

Air-to-be-treated supplied from the inflow port 11 to the filter 10 flows into the inflow space 52 through the communication passage 51. The air-to-be-treated flowed into the inflow space 52 further flows to an outer peripheral surface of the filter element 31, and is filtered through the filter element 31. Liquid and oil contained in the air-to-be-treated collide and agglomerate as they are filtered through the filter element 31, and grow into droplets of certain sizes. The droplets also contain fine dust filtered through the filter element 31. The droplets reach an inner peripheral surface of the filter element 31, and flow downward along this inner peripheral surface by their own weight.

The compressed air filtered through the filter element flows into the air passage space 47. Of the compressed air flowed into the air passage space 47, the compressed air flowed into a gap between the filter element 31 and the air guide pipe 41 further flows downward through the air passage space 47 in the axial direction of the filter element 31, passes through the slits 44, and flows into an inner space 55 of the blade cylinder 42. Additionally, of the compressed air flowed into the air passage space 47, the compressed air flowed into a gap between the filter element 31 and the blades 43 immediately passes through the slits 44 from the air passage space 47, and flows into the inner space 55 of the blade cylinder 42.

The compressed air passed through the slits 44 is given the component of velocity in the circumferential direction of the blade cylinder 42, and is not flowed directly to the inside of the blade cylinder 42 in the radially inward direction. As a result, the compressed air is swirled in the inner space 55. The droplets contained in the compressed air passing through the slits 44 adhere to the inner surfaces of the blades 43 by this swirling motion. The droplets, or foreign matters, adhered to the inner surfaces of the blades 43 flow downward along the blades 43 by their own weight. The purified compressed air removed of the foreign matters then moves upward, flows through the discharge pipe 35, the communication hole 36, and the outflow port 12 to the outside.

The blade cylinder 42 is provided inside the filter element 31. The droplets grown into certain sizes after being filtered through the filter element 31 adhere to the inner surfaces of the blades 43 by the swirling motion. Thus, the droplets agglomerate without scattering, and flow downward by their own weight. In this manner, efficiency of removing foreign matters, such as liquid, contained in the air-to-be-treated is improved.

The compressed air passes through the air passage space 47 formed between the air guide pipe 41 and the filter element 31, flows downward along the air guide pipe 41, and then flows into the slits 44. The compressed air has a component of velocity directing the air downward along the blades 43, and thus, this downward component of velocity is added to the flow swirled by the compressed air. Hence, a force to push the droplets downward is applied to the droplets adhered to the inner surfaces of the blades 43.

Even if the droplets adhered to the inner surfaces of the blades 43 are carried upward along with the air flowing through the inner space 55 toward the discharge pipe 35, the stepped portion 46 prevents the droplets from moving further upward. In other words, the droplets are not able to climb over the stepped portion 46 of the air guide pipe 41. The droplets, therefore, drop by their own weight without flowing toward the discharge pipe 35. This improves efficiency of removing foreign matters, such as liquid.

The droplets adhered to the inner surfaces of the blades 43 and moved downward by their own weight drop through the discharge hole 37a into the storage chamber 15a. A discharge pipe 61 is fitted in the liquid discharge hole 18, and foreign matters, such as liquid, are accumulated in the storage chamber 15a to be discharged through the discharge pipe 61. A leg portion 62 composed of four plate-like members is disposed inside the storage chamber 15a. The four plate-like members extend radially from the radial center of the leg portion 62. The leg portion 62 is provided with a seal member 63 that seals the liquid discharge hole 18. An operation knob 64 is rotatably attached to a lower end portion of the filter container 14, and is engaged with the discharge pipe 61. By rotating the operation knob 64, the discharge pipe 61 can be moved up or down. When the discharge pipe 61 is moved up by the operation knob 64, a state between the seal member 63 and the first container 16 is switched from being sealed to being opened. In this manner, foreign matters, such as liquid, in the storage chamber 15a is discharged to the outside through the discharge pipe 61.

A baffle plate 65 is disposed on top of the leg portion 62 so that the baffle plate 65 faces the discharge hole 37a. A plurality of fins 66 projecting upward are provided on outer peripheral portions of the baffle plate 65, each of the fins 66 extending in a radial direction of the baffle plate 65. Therefore, the swirling compressed air flowing from the discharge hole 37a to the storage chamber 15a is suppressed of its swirling by the fins 66. The compressed air suppressed of its swirling motion then flows upward through center portions of the blade cylinder 42 and the air guide pipe 41 toward the discharge pipe 35. Meanwhile, the droplets dropped into the storage chamber 15a through the discharge hole 37a are guided toward an inner peripheral surface of the first container 16 by the fins 66, and are accumulated in a lower portion of the storage chamber 15a. The filter container 14 is made of transparent resin, and allows an operator to visually confirm the amount of liquid accumulated in the storage chamber 15a from the outside. When an increase in the amount of liquid is visually confirmed, the operator operates the operation knob 64 to discharge foreign matters, such as liquid, from the storage chamber 15a to the outside.

Figure 7:
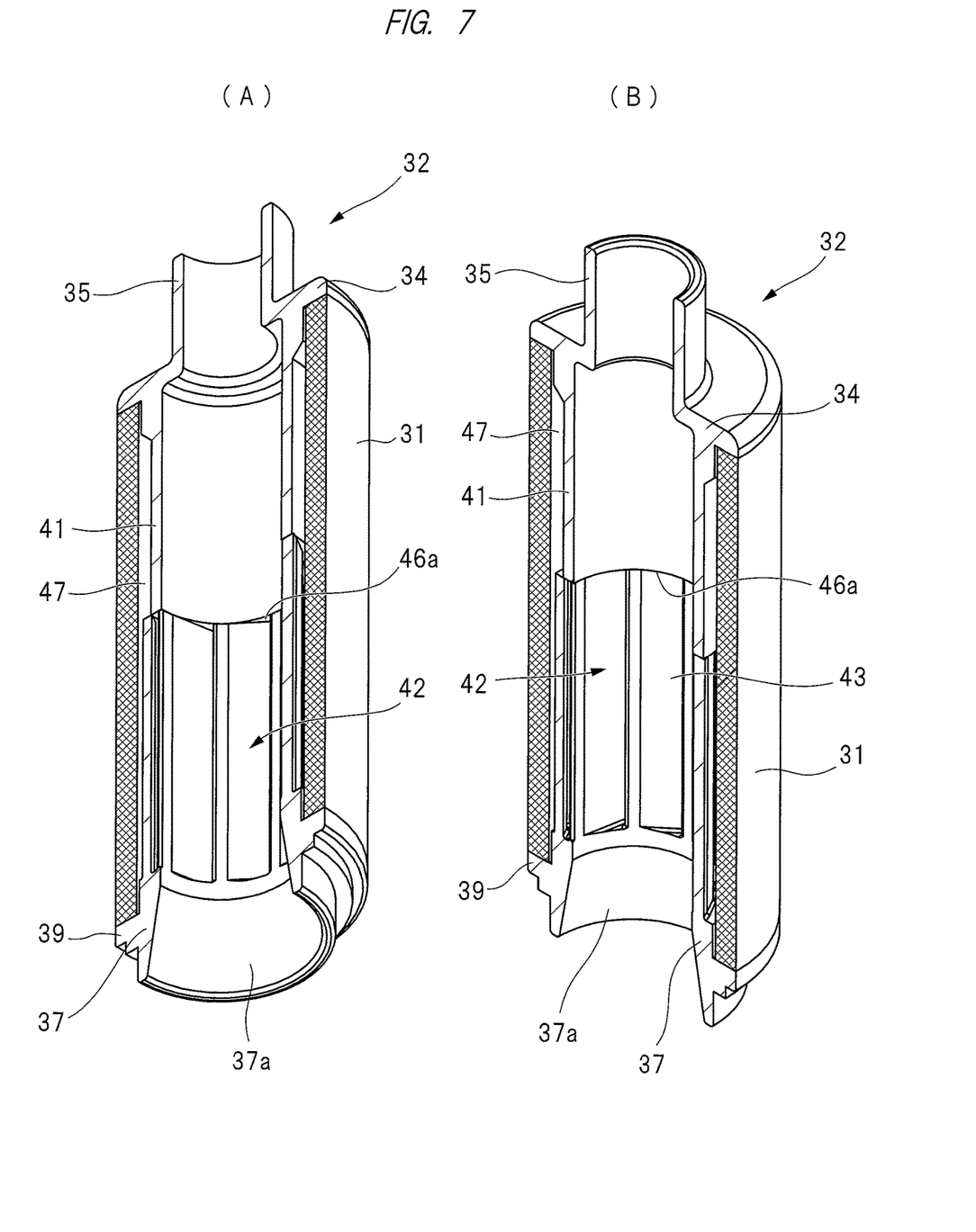
FIG. 7(A) is a perspective view showing a longitudinally-cut portion of a variant of the element assembly, as seen from a bottom side thereof.
FIG. 7(B) is a perspective view showing the longitudinally-cut portion of the element assembly of FIG. 7(A), as seen from a top side thereof.

FIG. 7 shows a variant of the element assembly. The air guide pipe 41 shown in FIG. 7 is not provided with the fitting portion 45 of FIG. 5 on its lower end portion. An entire lower end surface of the air guide pipe 41 is flat, and upper end surfaces of the blades 43 abut on the lower end surface of the air guide pipe 41. Therefore, the stepped portion 46 shown in FIG. 5 is not provided on the air guide pipe 41 of FIG. 7. Innermost portions of the inner surfaces of the blades 43 continuously extend to an inner peripheral surface of the air guide pipe 41. A stepped portion 46a extending in a radial direction of the air guide pipe 41 is formed between a lower end surface of the air guide pipe 41 and radially outside portions of the upper end surfaces of the blades 43, that is, portions of tilted surfaces of the blades 43.

Even in this structure in which the blades 43 abut on the lower end surface of the air guide pipe 41, and in which the stepped portion 46a is formed on the lower end surface of the air guide pipe 41, the stepped portion 46a prevents droplets adhered to the inner surfaces of the blades 43 from moving upward.

Figure 8:
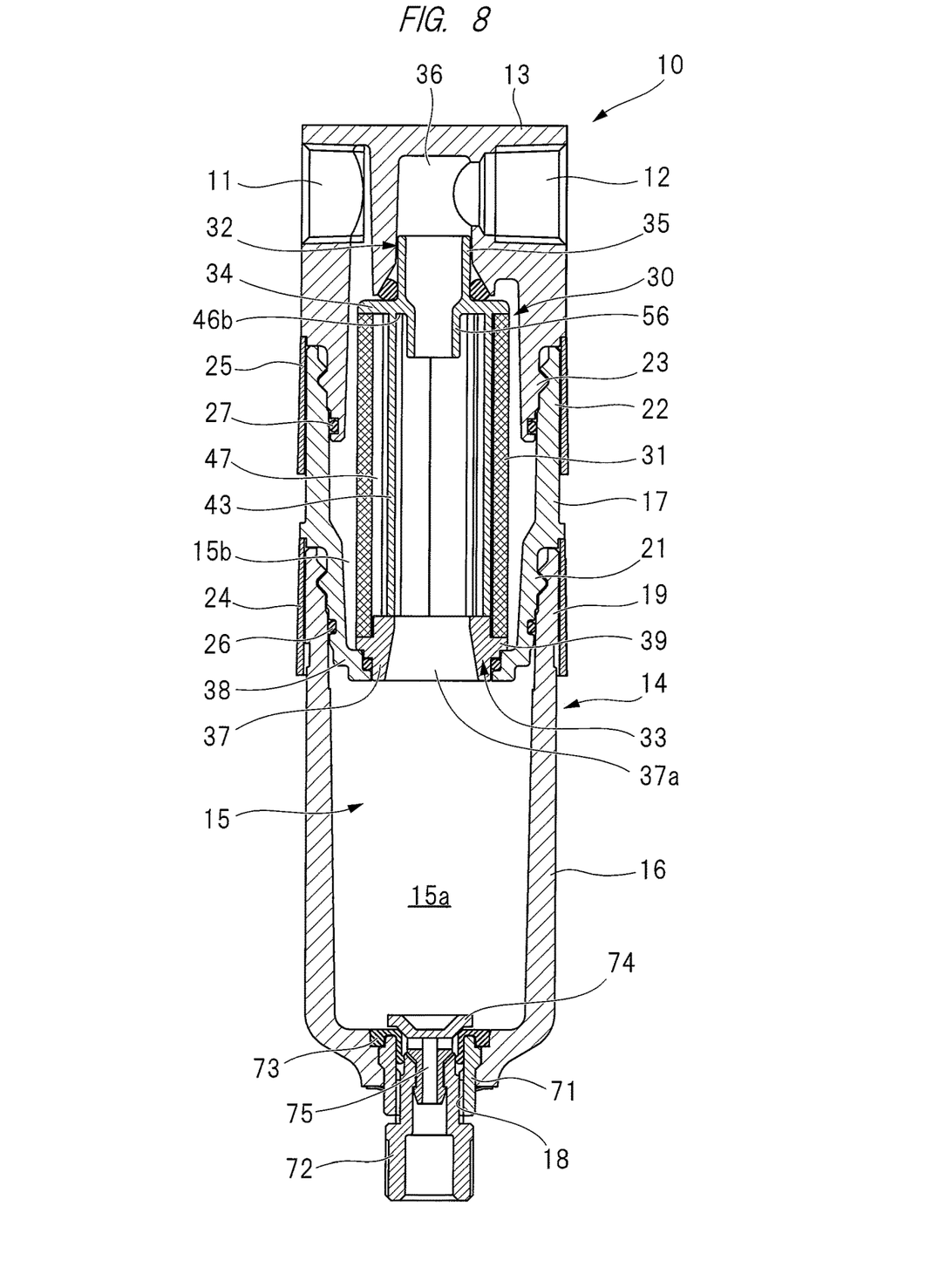
FIG. 8 is a longitudinal cross-sectional view showing a filter according to another embodiment of the present invention.

FIG. 8 is a longitudinal cross-sectional view of a filter 10 according to another embodiment of the present invention. In the element assembly 30 shown in FIG. 8, the blades 43 are integrally provided on the flange portion 34 of the upper holder 32. Lower end surfaces of the blades 43 abut on the lower holder 33. Hence, the blade cylinder 42 is provided between the flange portion 34 of the upper holder 32 and the annular portion 37 of the lower holder 33. Additionally, the filter element 31 is provided between the flange portion 34 of the upper holder 32 and the flange portion 39 of the lower holder 33, and surrounds the blades 43 as a whole in an axial direction of the blades 43.

A small-diameter guide pipe 56 is integrally provided on the flange portion 34. An outer diameter of the small-diameter guide pipe 56 is smaller than an inner diameter of the blade cylinder 42, and the small-diameter guide pipe 56 projects downward with respect to the upper end surfaces of the blades 43. A stepped portion 46b is formed on a lower surface of the flange portion 34, between the small-diameter guide pipe 56 and the blades 43. An outer surface of the small-diameter guide pipe 56 faces an inner surface of the blade cylinder 42, and a gap is formed between these surfaces. As a result, even if the droplets adhered to the inner surfaces of the blades 43 are carried upward along with the air flowing through the inner space 55 toward the discharge pipe 35, such droplets are not able to climb over the stepped portion 46b of the flange portion 34. The droplets are prevented from flowing toward the discharge pipe 35, and thus, efficiency of removing foreign matters, such as liquid, can be improved.

The filter 10 shown in FIG. 8 is not provided with the leg portion 62 and the baffle plate 65 of FIG. 1. In the filter 10 of FIG. 8, a sleeve 71 having the liquid discharge hole 18 is provided on a bottom portion of the filter container 14, and a discharge pipe 72 that serves as a drain cock is screwed to the sleeve 71. An opening/closing valve element 74 is engaged with the discharge pipe 72 and is operated to open and close a valve seat seal 73 provided on the filter container 14. The opening/closing valve element 74 is provided with a discharge hole 75, and by rotating the discharge pipe 72, the opening/closing valve element 74 can be moved up or down. The opening/closing valve element 74 is moved to be switched between a state in which the discharge hole 75 and the storage chamber 15a are communicating with each other, and a state in which the discharge hole 75 and the storage chamber 15a are blocked from communicating with each other. Therefore, when the amount of liquid accumulated in the storage chamber 15a increases, the operator operates the discharge pipe 72 to discharge foreign matters, such as liquid, from the storage chamber 15a to the outside.

The present invention is not to be limited to the above-mentioned embodiments and various modifications can be made as far as they do not depart from the scope of the invention, which is defined by the appended claims. For example, the filters 10 shown in the figures are drain filters designed to discharge foreign matters, such as liquid, accumulated in the storage chamber 15a by manual operation. However, the invention may also be applied to a filter with an automatic drain mechanism designed to automatically discharge foreign matters when a predetermined amount is reached in the storage chamber 15a.

The present invention is applied to a pneumatic circuit that supplies compressed air from a pneumatic source to a pneumatic device, and is utilized in the pneumatic circuit for removing foreign matters contained in the compressed air.

Although various embodiments of the present invention have been described and shown, the invention is not restricted thereto, but may also be embodied in other ways within the scope of the subject-matter defined in the following claims.

What is claimed is:

1. A filter for removing foreign matters contained in compressed air to purify the compressed air, the filter comprising:
    a port block provided with: an inflow port to which compressed air is supplied; and an outflow port from which purified compressed air flows out;
    a filter container attached to the port block, and forming a filter chamber and a storage chamber on a lower side of the filter chamber; and
    an element assembly disposed inside the housing chamber,
    wherein the element assembly comprises:
        an upper holder having a discharge pipe that is attached to the port block and communicates with the outflow port;
        a flange portion provided integrally with the upper holder;
        a lower holder attached to the filter container;
        a filter element provided between the upper holder and the lower holder;
        a blade cylinder provided inside the filter element, the blade cylinder having a plurality of blades that extend in a vertical direction of the blade cylinder, are tilted in a circumferential direction of the blade cylinder, and are arranged in a cylindrical form; and
        an air guide pipe provided in the upper holder and having an outer diameter smaller than an inner diameter of the filter element, and
    a fitting portion to which the blades are fitted is provided on a lower end portion of the air guide pipe, and a stepped portion is provided on the fitting portion, overhanging from a lower end surface of the fitting portion, more radially inward relative to inner surfaces of the blades.

2. The filter according to claim 1, wherein
the blade cylinder is integrally provided on the lower holder.

3. The filter according to claim 1, wherein
the filter container has:
a first container provided with a storage chamber and attached to the port block; and
a second container disposed between the first container and the port block so as to partition the filter chamber, the lower holder being attached to the second container.

4. An element assembly utilized in a filter that removes foreign matters contained in compressed air to purify the compressed air, the element assembly comprising:
an upper holder;
a lower holder;
a filter element provided between the upper holder and the lower holder;
a blade cylinder having a plurality of blades that extend in a vertical direction of the blade cylinder, are tilted in a circumferential direction, and are arranged in a cylindrical form, the blade cylinder being provided inside the filter element, and
an air guide pipe provided in the upper holder and having an outer diameter smaller than an inner diameter of the filter element,
wherein a fitting portion to which the blades are fitted is provided on a lower end portion of the air guide pipe, and a stepped portion is provided on the fitting portion, overhanging from a lower end surface of the fitting portion, more radially inward relative to inner surfaces of the blades.

5. The element assembly according to claim 4, wherein the blade cylinder is integrally provided on the lower holder.

6. The element assembly according to claim 4, wherein
an air passage space is provided between the air guide pipe and the filter element and between each of the blades and the filter element, and
an inner space provided inside the blade cylinder and the air passage space communicate with each other by a slit between the blades adjacent to each other in a circumferential direction.

7. An element assembly attached to a port block, the port block being provided with an inflow port to which air-to-be-treated is supplied, and with an outflow port from which purified compressed air flows out, the element assembly removing foreign matters contained in compressed air, which flows out from the inflow port, to purify the compressed air and to discharge the purified compressed air to the outflow port, the element assembly comprising:
an upper holder attached to the port block and provided with a discharge pipe that communicates with the outflow port;
a flange portion provided integrally with the upper holder;
a lower holder attached to a filter container;
a filter element provided between the upper holder and the lower holder;
a blade cylinder having a plurality of blades that extend in a vertical direction of the blade cylinder, are tilted in a circumferential direction, and are arranged in a cylindrical form, the blade cylinder being provided inside the filter element; and
an air guide pipe provided in the upper holder and having an outer diameter smaller than an inner diameter of the filter element,
wherein a fitting portion to which the blades are fitted is provided on a lower end portion of the air guide pipe, and a stepped portion is provided on the fitting portion, overhanging from a lower end surface of the fitting portion, more radially inward relative to inner surfaces of the blades.

* * * * *